United States Patent [19]
Marr et al.

[11] Patent Number: 5,249,639
[45] Date of Patent: Oct. 5, 1993

[54] STEERING CONTROL ARRANGEMENT

[75] Inventors: Jerry D. Marr, Metamora; Howard A. Marsden, Pekin; Noel J. Rytter, Peoria, all of Ill.

[73] Assignee: Caterpillar Inc., Peoria, Ill.

[21] Appl. No.: 915,733

[22] Filed: Jul. 24, 1992

[51] Int. Cl.[5] .......................... B62D 5/30; F16B 9/09
[52] U.S. Cl. ........................................ 180/133; 60/405
[58] Field of Search .................. 180/6.2, 6.26, 6.3, 180/6.44, 133, 140, 242, 301; 60/405

[56] References Cited
U.S. PATENT DOCUMENTS

| | | | |
|---|---|---|---|
| 4,131,177 | 12/1978 | Goodbary | 180/133 |
| 4,736,811 | 4/1988 | Marsden | 180/133 |
| 4,770,264 | 9/1988 | Wright et al. | 180/140 |

*Primary Examiner*—Mitchell J. Hill
*Attorney, Agent, or Firm*—John W. Grant

[57] ABSTRACT

Vehicles having front and rear pairs of steerable wheels are sometimes provided with large springs for moving one pair of the wheels to a straight-ahead position during emergency steering. Large amounts of hydraulic energy are expended solely for the compression of such springs every time the pair of wheels are steered. A back-up steering control system (19) of the present steering control arrangement (10) has a servo valve (76) operative to control the flow of pressurized fluid from a back-up pump (60) to a steering control valve (21) which in turn controls the flow of pressurized fluid from the back-up pump to a hydraulic actuator (13) to hydraulically move a first pair of steerable wheels (11) to a straight-ahead position during emergency steering conditions. A manual control valve (68) is operative to control the flow of pressurized fluid from the back-up pump (60) to another steering control valve (22) which in turn controls the flow of pressurized fluid to a hydraulic actuator (16) for effecting steering of a second pair of steerable wheels (12) during the emergency steering condition.

10 Claims, 1 Drawing Sheet

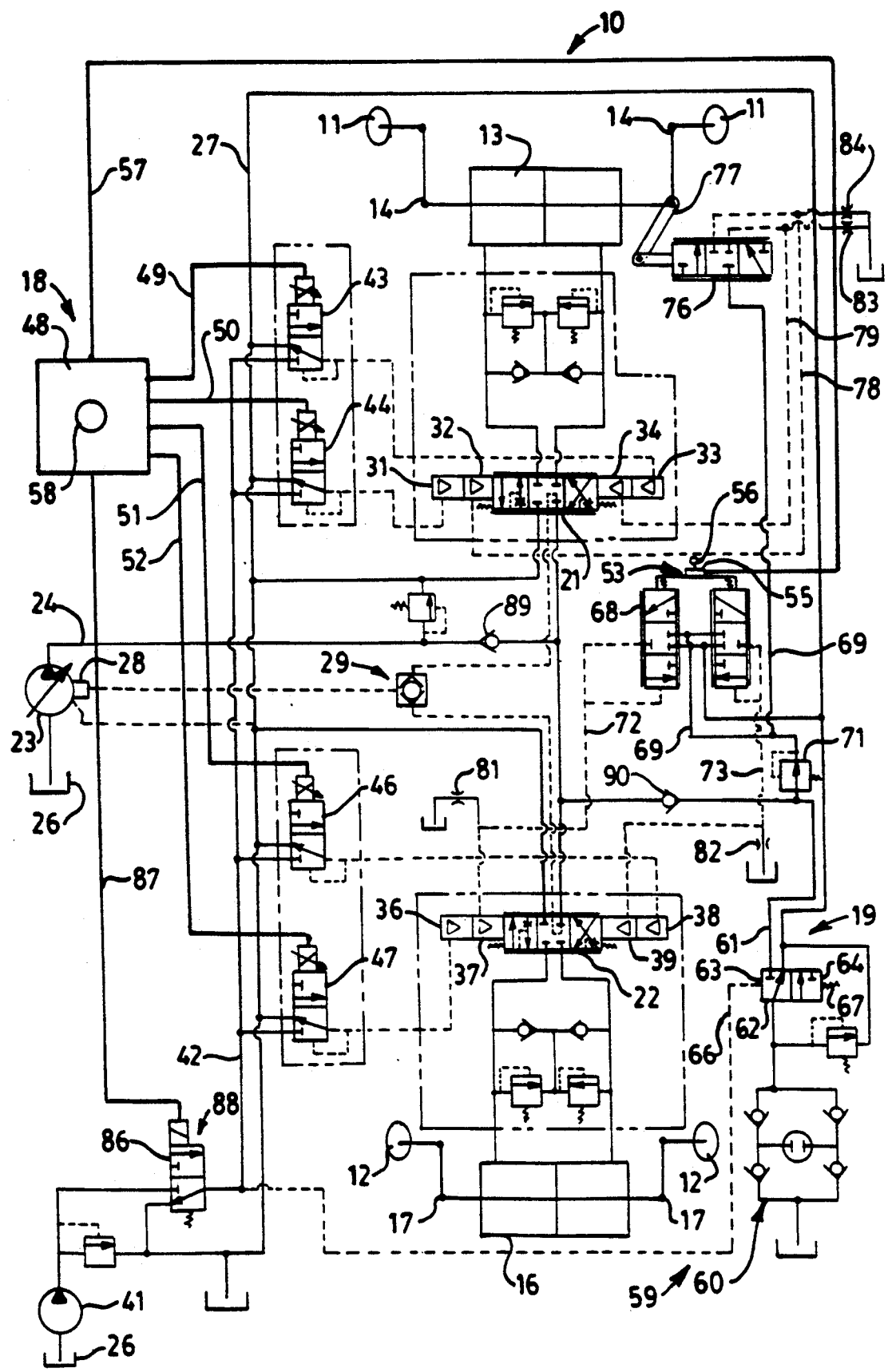

STEERING CONTROL ARRANGEMENT

TECHNICAL FIELD

This invention relates to a steering system for a vehicle having both front and rear wheel steering and more particularly to a back-up steering control system.

BACKGROUND ART

Vehicles in which both the front and rear wheels are steered in many instances, utilize a computer or microprocessor controlled steering control arrangement. During a steering maneuver, the position and/or rate of movement of many of the components of the steering control arrangement are sensed electronically and electrical input signals directed to the microprocessor for controlling the position of both the front and rear wheels responsive to programmed conditions when requested by the vehicle operator.

It is generally believed that in the event of an electronic failure, manual controlling of both the front and rear wheels would be extremely difficult for the typical operator and that any back-up steering control should automatically center one set of wheels to the straight-ahead position with manual steering then utilizing the other set of wheels. One such steering system is disclosed in U.S. Pat. No. -A-4,770,264, in which one of the hydraulic actuators is spring biased to the straight-ahead position in the event of an electrical or hydraulic failure. One of the problems associated with that steering system is that the springs are necessarily compressed during each steering maneuver. Since such springs would necessarily have to be sufficiently large to center the associated wheels under the most adverse conditions, large expenditures of energy are consumed by the hydraulic system during every steering maneuver. Moreover, that system does not address the issue of providing a back-up steering control capable of steering the vehicle in the event of a hydraulic failure.

In view of the above, it would be desirable to provide a steering control system with a back-up steering control device which would automatically center one set of wheels to the straight-ahead condition in the event of an electronic failure and which would not utilize an excess amount of hydraulic energy during the normal steering maneuvers.

It would, moreover, be desirable to provide a back-up steering control circuit which provides an additional source of pressurized fluid for steering the vehicle in the event of a failure in both the electronic and hydraulic portions of the primary steering control.

The present invention is directed to overcoming one or more of the problems as set forth above.

DISCLOSURE OF THE INVENTION

In one aspect of the present invention, a steering control system is provided for a vehicle having first and second pairs of steerable wheels and first and second hydraulic actuators individually operatively connected to the first and second pairs of steerable wheels. The system comprises a hydraulic pump, first and second steering control valves connected to the hydraulic pump and individually connected to the first and second hydraulic actuators respectively, and primary steering control means for controlling the position of the first and second steering control valves to effect steering movement of the first and second pair of steerable wheels. Back-up steering control means are provided for automatically hydraulically powering the first pair of steerable wheels to a straight-ahead condition and for controlling the position of the second steering control valve upon a failure of the primary steering control means.

Advantageously, the steering control arrangement includes a back-up steering control means which utilizes hydraulic power for automatically centering the first pair of steerable wheels to a straight-ahead condition upon a failure of the primary steering control means. The back-up steering control means also provides for controlling the position of a steering control valve associated with the second pair of steerable wheels to provide for steering the vehicle when the primary steering control means has failed.

Other objects and advantages of the present invention will become readily apparent upon reference to the accompanying drawing and following description.

BRIEF DESCRIPTION OF THE DRAWINGS

The sole figure is a schematic illustration of the steering control arrangement of an embodiment of the present invention.

BEST MODE FOR CARRYING OUT THE INVENTION

A steering control arrangement 10 for a vehicle has a first pair of steerable wheels 11, a second pair of steerable wheels 12, a first hydraulic actuator 13 operatively connected to the first pair of wheels 11 through a steering linkage 14, a second hydraulic actuator 16 operatively connected to the second pair of wheels through a steering linkage 17, a primary steering control system 18, and a back-up steering control system 19. The primary steering control system 18 includes first and second pilot operated steering control valves 21,22 in fluid communication with the first and second hydraulic actuators 13,16, respectively. Both of the steering control valves are connected to a load sensing variable displacement pump 23 through a supply conduit 24 and to a tank 26 through an exhaust conduit 27. The pump 23 has a displacement controller 28 connected to a load sensing network 29 which is connected to both of the steering control valves 21,22 for directing the highest load pressure in the actuators 13,16 to the displacement controller in the usual manner. The first steering control valve 21 has a first pair of actuating chambers 31,32 at one end thereof and a second pair of actuating chambers 33,34 at the other end thereof. Similarly, the second steering control valve 22 has a first pair of actuating chambers 36,37 at one end thereof, and a second pair of actuating chambers 38,39 at the other end thereof.

The primary steering control system 18 also includes a pilot pump 41 connected to a pilot supply line 42, a plurality of electrohydraulic proportional valves 43,44,46,47 connected to the pilot supply line 42, and a microprocessor 48 connected to the proportional valves 43.,44,46,47 through a plurality of electrical leads 49,50,51,52. The proportional valves 43,44 are hydraulically connected to the actuating chambers 31,33, respectively, of the first steering control valve 21. Similarly, the proportional valves 46,47 are hydraulically connected to the actuating chambers 36,38, respectively of the second steering control valve 22. A manual steering input device 53 includes a position sensor 55 operatively associated with a control handle 56 and is connected to the microprocessor 48 through an electrical lead 57. The microprocessor has a mode selector knob 58 thereon. Further numerous pressure and position sensors, not shown, are operatively associated with various components of the control system 18 and connected to the microprocessor to transmit electrical signals thereto.

The back-up steering control system 19 includes a back-up steering control means 59 for automatically hydraulically powering the first pair of steerable wheels 11 to a straight-ahead condition and for controlling the position of the second steering control valve 22 upon a failure of the primary steering control system 18. The back-up steering control means 59 includes a ground driven pump 60 connected to the supply conduit 24 through an auxiliary supply conduit 61. A pilot operated diverter valve 62 is disposed in the auxiliary supply conduit 61 and has opposite ends 63,64. A pilot line 66 connects the pilot supply line 42 to the end 63 of the diverter valve. A spring 67 is connected to the end 64 of the diverter valve. A pilot control valve 68 is connected to the auxiliary supply conduit 61 through a branch conduit 69 having a pressure reducing valve 71 disposed therein. The pilot control valve 68 is connected to the actuating chambers 37,39 of the second steering control valve 22 through a pair of pilot lines 72,73 respectively. The control handle 56 is operatively connected to the pilot control valve 68 for manual actuation thereof. A servo valve 76 is operatively connected to the first actuator 13 through a linkage 77. The servo valve 76 is hydraulically connected to the branch conduit 69 and to the actuating chambers 32,34 of the first control valve 21 through a pair of pilot lines 78,79. A plurality of bleed orifices 81,82,83,84 are individually disposed between the pilot lines 72,73,78,79 and the tank 26. A solenoid actuated selector valve 86 is disposed in the pilot supply line 42 and is connected to the exhaust conduit 27. The selector valve 86 is connected to the microprocessor 48 through an electrical lead 87 and is resiliently biased to a position at which the pilot supply line 42 is vented to the exhaust conduit 27. The selector valve 86 constitutes a means 88 for rendering the back-up steering control means 59 inoperative when the primary steering control system 18 is operative. A pair of check valves 89,90 are suitably disposed in the supply conduit 24 and the auxiliary supply conduit 61, respectively.

Industrial Applicability

In the normal operation of the steering control arrangement 10, the microprocessor 48 continuously checks the signals from the sensors to determine if the signals meet programmed parameters. If all signals are within the parameters indicating that the primary steering control system 18 is operational, the microprocessor 48 directs an electrical command signal through the lead 87 to urge the solenoid actuated valve 86 to a position at which fluid from the pilot pump 41 is directed through the pilot supply line 42. The pressurized fluid in the pilot supply line 42 is also communicated through the pilot line 66 to move the diverter valve 62 to a position at which the fluid from the ground driven pump 60 is blocked from the steering control valves 21,22 and is communicated to the exhaust conduit 27. This renders the back-up steering control system 19 inoperative when the primary steering control system 18 is operative. Steering with the primary steering control system is initiated by moving the control handle 56 in the desired direction. In so doing, an electrical signal commensurate with the direction and degree of movement of the control handle 56 is directed from the sensor 55 through the lead 57 to the microprocessor 48. The microprocessor 48 processes the signal and dependent upon the steering mode selected, directs an appropriate signal through one or more of the electrical leads 49,50,51, or 52. For example, an electrical signal transmitted through the lead 49 actuates the proportional valve 43 to controllably direct pressurized pilot fluid to the actuating chamber 33 to move the steering control valve 21 leftwardly to an operative position. At the leftward position, the valve 21 directs fluid from the supply conduit 24 to the hydraulic actuator 13 causing it to move to the right thereby pivoting the wheels 11 simultaneously in a first steering direction. Similarly, directing an electrical signal through the lead 50 causes the hydraulic actuator 13 to move leftwardly to pivot the wheels 11 in a second steering direction. The wheels 12 are also similarly pivoted in a first or second direction in response to electrical signals transmitted through the leads 51 or 52. The selector knob 58 is operable to select one of four different modes of steering. In one mode, only the wheels 11 are used for steering. In another mode, only the wheels 12 are used for steering. In still another mode, both sets of wheels 11,12 are used for steering in a circle while the final mode is when both sets of wheels 11,12 are used for crab steering.

The servo valve 76 is moved from the neutral position shown in response to movement of the hydraulic actuator 13 in either direction. However, since the fluid from the ground driven pump 60 is diverted to the exhaust conduit 27 when the primary steering control system 18 is operating normally, movement of the servo valve 76 has no effect on the positioning of the steering control valve 21. However, should the microprocessor detect that one or more of the signals received thereby do not meet the parameters indicating that a failure has occurred in the primary steering control system 18 or if the microprocessor itself fails, the command signal to the solenoid valve 86 is interrupted and the solenoid valve is biased to the position shown to vent the pilot supply line 42 to the tank. This allows the diverter valve 62 is be spring biased to the operational position for communicating fluid from the ground driven pump 60 to the auxiliary supply conduit line 61. Should the primary steering control system failure occur when the wheels 11 are in a pivoted condition and the servo valve 76 is in an actuated position, the pressurized fluid passing from the conduit 61 through the pressure reducing valve 71 and the branch conduit 69 is directed by the servo valve 76 to the appropriate one of the actuating chambers 32 or 34 to move the steering control valve 21 to an operating position for directing fluid from the conduit 61 to the actuator 13. Such pressurized fluid moves the actuator 13 back to the position shown thereby centering the wheels 11 in the straight-ahead condition. As the hydraulic actuator 13 moves to the straight-ahead position shown, the servo valve 76 is moved to the neutral position shown subsequently blocking the flow of pilot fluid to the actuating chamber 32 or 34 such that when the wheels 11 reach the centered or straight-ahead position, the steering control valve 21 hydraulically locks the actuator 13 and thus the wheels 11 in the straight-ahead position.

The back-up steering control system 19 is now operative to hydraulically control the position of the steering control valve 22. More specifically, clockwise movement of the control handle 56 causes the pilot control valve 68 to direct pressurized fluid through the pilot line 73 to the actuating chamber 39, thereby moving the steering control valve 22 leftwardly as viewed in the drawing. This directs pressurized fluid from the auxiliary supply conduit 61 to the hydraulic actuator 16 to pivot the wheels 12 in the first steering direction. Similarly, counterclockwise movement of the control handle 56 directs pressurized fluid through the pilot line 72 for moving the steering control valve 22 rightwardly to cause the hydraulic actuator 16 to pivot the wheels in the second steering direction.

In view of the foregoing, it is readily apparent that the structure of the present invention provides an improved steering control arrangement having a back-up steering control system which automatically hydraulically moves a first pair of steerable wheels to a straight-ahead position when a failure occurs in the primary steering control system and the first pair of steerable wheels are in a pivoted steering position. Since the back-up steering control system is essentially inoperative when the primary steering control system is operational, no substantial additional expenditure of hydraulic energy is wasted during the normal steering conditions. Moreover, the back-up steering control system provides an additional supply of hydraulic fluid for steering a second pair of steerable wheels for maneuvering the vehicle when a failure occurs in the primary steering control system.

Other aspects, objects, and advantages of this invention can be obtained from a study of the drawing, the disclosure, and the appended claims.

We claim:

1. A steering control arrangement (10) for a vehicle having first and second pairs of steerable wheels (11,12) and first and second hydraulic actuators (13,16) individually operatively connected to the first and second pairs of steerable wheels (11,12) comprising:
   a hydraulic pump (23);
   first and second steering control valves (21,22) connected to the hydraulic pump (23) and individually fluidly connected to the first and second hydraulic actuators (13,16);
   primary steering control means (18) for controlling the position of the first and second steering control valves (21,22) to effect steering movement of the first and second pairs of steerable wheels (11,12); and
   back-up steering control means (59) for automatically hydraulically powering the first pair of steerable wheels (11) to a straight-ahead condition and for controlling the position of the second steering control valve (22) upon a failure of the primary steering control means (18).

2. The steering control arrangement (10) of claim 1 wherein the back-up steering control means (59) includes another hydraulic pump (60), a servo valve (76) mechanically connected to the first hydraulic actuator (13) and hydraulically connected to the another hydraulic pump (60) and to the first steering control valve (21).

3. The steering control arrangement (10) of claim 2 wherein the back-up steering control means (59) includes a pilot control valve (68) connected to the another hydraulic pump (60) and to the second steering control valve (22).

4. The steering control arrangement (10) of claim 3 wherein the back-up steering control means (59) includes a diverter valve (62) fluidly connected to the another hydraulic pump (60) and to the first and second steering control valves (21,22) and being movable between a first position at which the another pump (60) is blocked from the first and second steering control valves and a second position at which hydraulic fluid from the another pump (60) is communicated to the first and second steering control valves.

5. The steering control arrangement (10) of claim 4 wherein the diverter valve (62) is maintained in the first position when the primary steering control means (18) is operational and moves to the second position upon failure of the primary steering control means.

6. The steering control arrangement (10) of claim 5 wherein the primary steering control means (18) includes a pilot pump (41) and the back-up steering control means (59) includes a solenoid actuated valve (86) fluidly connected to the pilot pump (41) and to the diverter valve (62) and movable between a first position at which pressurized pilot fluid is directed to the diverter valve and a second position interrupting the communication of pilot fluid to the diverter valve and wherein the solenoid actuated valve (86) is moved to the first position by a command signal from the primary steering control means.

7. The steering control arrangement (10) of claim 6 wherein the back-up steering control means (59) includes a pressure reducing valve (71) positioned between the diverter valve (62) and the pilot control valve (68).

8. The steering control arrangement (10) of claim 5 wherein the back-up steering control means (59) includes a means (88) for rendering the back-up steering control means (59) inoperative when the primary steering control means (18) is operative.

9. The steering control arrangement (10) of claim 8 wherein the primary steering control means (88) includes a pilot pump (41) and rendering means (88) includes a selector valve (86) fluidly connected to the pilot pump (41) and to the diverter valve (62) and being movable between a first position at which pressurized pilot fluid is directed to the diverter valve (62) and a second position interrupting the communication of pilot fluid to the diverter valve and wherein the selector valve (86) is moved to the first position by a command signal from the primary steering control means.

10. The steering control arrangement (10) of claim 9 wherein the selector valve (86) is a solenoid actuated selector valve moved to the first position by an electrical command signal.

* * * * *